(12) United States Patent
Watkins (10) Patent No.: US 11,256,032 B1
(45) Date of Patent: Feb. 22, 2022

(54) PROGRAMMABLE FIBER-OPTIC DELAY LINE

(71) Applicant: dSPACE digital signal processing and control engineering GmbH, Paderborn (DE)

(72) Inventor: Jonathan Watkins, Los Angeles, CA (US)

(73) Assignee: DSPACE GMBH, Paderborn (DE)

( * ) Notice: Subject to any disclaimer, the term of this patent is extended or adjusted under 35 U.S.C. 154(b) by 0 days.

(21) Appl. No.: 17/121,839

(22) Filed: Dec. 15, 2020

(51) Int. Cl.
    *G02B 6/28* (2006.01)
    *G01S 7/40* (2006.01)
    *G02F 1/313* (2006.01)

(52) U.S. Cl.
    CPC .......... *G02B 6/2861* (2013.01); *G01S 7/4065* (2021.05); *G02B 6/2817* (2013.01); *G02F 1/313* (2013.01); *G02F 2201/205* (2013.01)

(58) Field of Classification Search
    CPC ..... G02B 6/2861; G02B 6/2817; G02F 1/313; G02F 2201/205; G01S 7/4065
    See application file for complete search history.

(56) References Cited

U.S. PATENT DOCUMENTS

| | | | | |
|---|---|---|---|---|
| 5,177,488 A * | 1/1993 | Wang | .................... | G01S 7/4052 342/167 |
| 6,163,194 A * | 12/2000 | Truong | ................ | H03K 5/1515 327/239 |
| 7,724,994 B1 * | 5/2010 | Pepper | .................... | G02F 1/313 385/27 |
| 2002/0071151 A1 * | 6/2002 | Zaacks | ............... | H04Q 11/0005 398/45 |
| 2012/0104268 A1 * | 5/2012 | Burr | ...................... | G01T 1/2985 250/370.09 |
| 2012/0141133 A1 * | 6/2012 | Mazzochette | ....... | H04J 14/0227 398/130 |
| 2019/0041496 A1 * | 2/2019 | Salvesen | ............... | G01S 7/4052 |

FOREIGN PATENT DOCUMENTS

WO     WO 9307508 A1     4/1993

* cited by examiner

*Primary Examiner* — Leslie C Pascal
(74) *Attorney, Agent, or Firm* — Leydig, Voit & Mayer, Ltd.

(57) ABSTRACT

A programmable fiber-optic delay line simulates spatial distances for an environment sensor. The programmable fiber-optic delay line comprises: at least three optical transfer switches interconnected by a plurality of lengths of optical fiber, wherein the at least three optical transfer switches with the plurality of lengths of optical fiber are configured to provide a continuous delay line having a plurality of different selectable delay values, wherein the different delay values are selectable based on switch positions of the at least three optical transfer switches. A first terminal of a first optical transfer switch of the at least three optical transfer switches is connected to a third optical transfer switch of the at least three optical transfer switches, enabling bypassing of a second optical transfer switch of the at least three optical transfer switches.

5 Claims, 5 Drawing Sheets

PROGRAMMABLE FIBER-OPTIC DELAY LINE

FIELD

The invention relates to a programmable fiber-optic delay line and a target simulator having a programmable fiber-optic delay line.

BACKGROUND

An environment sensor is understood to be an electronic control unit having at least one sensor radiating element for radiating a transmitted signal and a sensor receiving element for receiving a reflected signal. These environment sensors work on a scanning principle using electromagnetic waves. They transmit a transmitted electromagnetic signal and detect the signal reflected from environmental objects, from which they draw conclusions about the distance and/or the speed and other properties of the environmental object. These sensors are mainly radar sensors, but lidar sensors may also be tested. Radar and lidar sensors basically differ only in the frequency of the electromagnetic radiation used.

Environment sensors of the above-mentioned type are used, for example, to obtain measurement data from a vehicle's surroundings for an automatic emergency brake (AEB), for an adaptive cruise control (ACC), and for lane change support (LCS). These safety-relevant automatic controllers require real-time information about the position and speed of approaching obstacles, such as road users or stationary objects in the vehicle's surroundings, in order to be able to intervene in the control of the vehicle in good time to avoid collisions.

Typical environment sensors include one or more radiating and receiving elements; i.e., for example, radar antennas, a logic for measuring and analyzing detected radar signals, and interfaces to other control units of the vehicle. The radar transmits suitable electromagnetic waves in the RF range—here the transmitted signal—in a specific direction into its surroundings and waits for a reflected echo signal—here the reflected signal.

Conventionally, testing these kinds of sensors is relatively complex and costly. In the prior art, there are known test benches such as those recently used in the testing of control units. Test benches of this kind are used, for example, for testing automotive control units. In such tests, the control unit is exposed to a simulated environmental scene with virtual environmental objects, and the response of the control unit is analyzed. Typical test situations also include functional tests and calibration tasks at the end of the production line of environment sensors. In order to create as realistic a situation as possible in these test situations, the sensor's control unit should be stimulated with real sensor signals, so that it is unable to distinguish the test situation from a "real" measurement situation. In this context, high demands are placed on the accuracy of the simulated signal.

To this end, a real-time capable simulator system computes a simulated environmental scene, from which a target simulator generates physical signals to which the control unit to be tested is exposed. The transmission of such a physical echo signal is triggered by the test bench receiving a transmitted signal from the control unit.

In order for the environment sensor under test to achieve the desired measurement results based on a simulated echo signal received, a delay must be impressed upon the echo signal in addition to other parameters, such as, for example, a Doppler shift. The distance measurement of the environment sensor is based on the propagation time principle, the environment sensor measuring the signal propagation time between the transmission and the detection of the reflected signal and calculating the distance of the detected object therefrom.

Thus, one functionality of the target simulators used for the testing of environment sensors is to delay the scanning signal transmitted by the environment sensor. This can be done using different techniques, a particularly advantageous technique being to produce the delay by longer signal paths through fiber-optic waveguides in a fiber-optic delay line.

Such a delay line is known, for example, from WO93/07508. Typical difficulties of the various approaches for delaying signals to simulate distances generally include providing as small a minimum simulatable distance as possible, as large a simulatable total distance as possible, and a fine-step resolution of the simulatable distances between the two end points.

SUMMARY

In an exemplary embodiment, the present invention provides a programmable fiber-optic delay line for simulating spatial distances for an environment sensor that is based on electromagnetic waves. The programmable fiber-optic delay line comprises: at least three optical transfer switches interconnected by a plurality of lengths of optical fiber, wherein the at least three optical transfer switches with the plurality of lengths of optical fiber are configured to provide a continuous delay line having a plurality of different selectable delay values, wherein the different delay values are selectable based on switch positions of the at least three optical transfer switches. A first terminal of a first optical transfer switch of the at least three optical transfer switches is connected to a third optical transfer switch of the at least three optical transfer switches, enabling bypassing of a second optical transfer switch of the at least three optical transfer switches.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

A fiber-optic delay line according to exemplary embodiments of the invention has a number of cascaded optical transfer switches. In this context, an optical transfer switch is generally understood to be a 2×2 switch having four terminals for coupling-in of optical signals, the terminals being arranged in pairs at the top and bottom of the switch. Such an optical transfer switch has up to five different switching states: straight-through-connection of upper or lower terminals, respectively ("bar state"), or cross-connection of an upper and a lower terminal in either of two alternative directions (top-left to bottom-right or vice versa), or cross-connection of the latter two variants at the same time ("cross state"). In this connection, it should be noted the terms "top" and "bottom" have been arbitrarily chosen to describe the mirror-symmetrical topology. Consequently, these terms have nothing to do with the orientation of the switch relative to the surface of the earth. It should also be noted that other variants of transfer switches may also be used, and that not all of the aforementioned switching states have to be used.

The above-described terminals of the optical transfer switches are also referred to as pigtails. They include two short pieces of a fiber-optic waveguide with an optical coupling element via which an optical signal can be coupled into the switch. The length of these pigtails contributes to the total delay of the optical delay line and increases the minimum impressible delay. It is, therefore, advantageous to keep the total length as short as possible when a minimum delay is selected. Therefore, it is desired to minimize the number of switches placed in the delay line for this setting.

The delay line is composed of cascaded optical transfer switches. In simplified terms, the switches form a row. At one side of the row, such as the top or bottom side, adjacent pigtails are connected directly to one another. Here, the terms "bottom/top" correspond with the definition given above. The respective other row is interconnected by fiber-optic delay elements of predefined length.

The outer optical transfer switches in the row then form the input and output of the delay line. The connection of a first transfer switch to a third transfer switch, bypassing a second transfer switch, may be accomplished via a delay element of predefined length or directly by connecting the terminals. The advantage of this approach is that this bypass makes it possible to reduce the total number of switches or at least to reduce the simulatable minimum delay.

The operating principle of the delay line is such that by setting the switching states of the optical transfer switches, it is possible to select different combinations of delay lengths. The switching states are set by a computer system which is connected to the optical transfer switches via suitable data connections and is capable of controlling the switching states of the transfer switches.

During the design of the delay line, the length of the delay elements is determined such that the different desired delay values can be set between a desired minimum delay value and a desired maximum delay value through selection of the different switching states. In this connection, it should be appreciated that with the increase in the number of switches used, the number of delay increments does increase, but so does also the magnitude of the delay that is provided by the delay line anyway.

In this embodiment, the connection of the first switch to the third switch, bypassing the second switch, is accomplished via a delay element of predefined length. It is possible to bypass one or more switches. An advantage of this embodiment is that the number of transfer switches used for setting a minimum delay can be kept lower than is customary in the prior art.

A preferred embodiment of the invention provides that the optical delay line be composed of a first number of optical transfer switches and a second number of optical transfer switches. It is provided that two switches perform the function of breakout switches, and that a distribution transfer switch be provided. Like all the other switches, the breakout switches and the distribution transfer switch are optical transfer switches. They are connected in the fiber-optic delay line in such a way that a signal passes either through all the switches of the first and second numbers of switches or only through the first number of transfer switches. This has the advantage that a large number of different delay values can be applied while achieving a reduced minimum total delay. It is known in the art that for a delay line including N different delay elements, N+1 transfer switches are used, which then all contribute to the minimum possible delay. An advantage of the invention is that only the transfer switches up to the breakout switch contribute to the minimum delay, while the total delay line has a significantly larger number of transfer switches, namely the transfer switches of the first and second numbers of transfer switches together.

The position where the delay line is interrupted is selected depending on the specific design of the delay line. For this purpose, consideration is given to the demands on the step size of the selectable delay values. From this, and based on the length of the connections that directly connect the terminals (pigtails), a statistically optimal position results for the breakout switches.

A preferred embodiment of the invention provides that two of the fiber-optic delay elements be selected to have the same length. This approach is based on the realization that the production of lengths of optical fiber is subject to an inaccuracy in the range of the desired step size. Choosing two delay elements of the same length may be advantageous if the demands on the maximum delay are lower than what is achievable with the number of switches and the selected delay elements. The goal is to achieve the same total delay setting with a plurality of switching state combinations of the transfer switches. Then, by duplicating two delay elements in the range of larger delays, it is possible to provide a way to calibrate the delay line prior to use in such a way that it satisfies the desired requirements for the step size accuracy and for the accuracy of the simulated distance. To this end, all combinations possible with the delay line are subjected to a test signal and successively subjected to measurement. The test signal is generated and measured back by an external device. The measurement results are then sorted by the magnitude of the delay, and the delay line is programmed so as to allow setting of the selected—exact—delays.

A preferred embodiment of the invention provides that the delay line be used in a target simulator. In very general terms, the environment sensor to be tested may be a radar distance sensor, an ultrasonic sensor, or a lidar sensor. The target simulator has suitable simulator radiating and receiving elements. In the case of a radar distance sensor, these two elements are provided by simulator-side radar antennas. Further provided is a down-conversion mixer which down-converts the scanning signal that is transmitted by the environment sensor to be tested and received by the simulator receiving element to an intermediate frequency, as well as an optocoupler for converting the electrical intermediate frequency signal into an optical signal. This signal can be coupled into the delay line in an exemplary embodiment and have the desired delay applied thereto via a program-controlled setting of the optical transfer switches. Also provided is an additional optocoupler which is capable of converting the delayed signal into an electrical intermediate frequency signal. Moreover, optionally, an amplifier may be provided and used to attenuate or amplify the signal. The advantage of such a component is that more realistic echo signals can be generated. For example, a more distant object is typically detected with a weaker echo signal than a closer one. Thus, using an amplification/attenuation component, the simulated echo signal can be generated in a more realistic manner. Furthermore, a Doppler generator may be provided which is configured to impress a Doppler frequency upon the signal so as to simulate a relative speed with respect to the environment sensor to be tested. Also provided is an up-conversion mixer which up-converts the signal from the intermediate frequency to an RF frequency and provides it for transmission by the simulator transmitting element. It is not mandatory to adhere to the order of the components described herein. Other combinations are likewise conceivable. Also, it may be provided that the Doppler generator and the up-conversion mixer be implemented in one component.

A preferred embodiment of the invention provides that the target simulator have a self-test function. For this purpose, it is provided that the target simulator have a test signal generation component for generating a test signal and coupling it into the signal path at a point within the target simulator, such as, for example, at the optocoupler that converts the electrical signal into an optical signal, or at the down-conversion mixer. The test signal may be, for example, generated by a laser or an electrical signal source. Further provided is a signal detection component which measures the test signal and determines its signal propagation time. This measurement may be performed at different points in the signal path, such as, for example, at the optocoupler that converts the optical signal into an electrical signal, or at the up-conversion mixer. The advantage of a self-test function is that it makes it possible to determine at any time during the use of the target simulator whether the delay value provided by the delay line is the desired value. During the operation of the device, changes may occur to the internal components over time, which may corrupt the simulated echo signal. High accuracy and reliability of the simulation signal are of importance, in particular in tests at the end of production lines (end-of-line tests), because environment sensors generally have safety-critical functionalities. The possibility of injecting a test signal at different points into the signal path of the target simulator and measuring it back provides a flexible and time-economical way to keep the test quality constant.

A preferred embodiment of the invention provides that the target simulator be installed in a test bench setup. The test bench setup provides for disposing the simulator transmitting elements of the target simulator at predetermined positions in the scene perceived by the environment sensor to be tested, and for making an echo signal originating from these positions perceivable to the environment sensor to be tested. This may be ensured by moving/rotating the environment sensor to be tested relative to statically disposed simulator transmitting elements, but also by moving the simulator transmitting elements relative to a statically disposed environment sensor to be tested, or by controlling a plurality of simulator transmitting elements disposed within the scene.

Exemplary embodiments of the invention will now be described in more detail with reference to the drawings, in which like parts are designated by the same reference numerals. The illustrated embodiments are highly schematic; i.e. the distances and the lateral and vertical extents are not true to scale and, unless indicated otherwise, do not have any derivable geometric relations to each other either.

In the drawings,

FIG. 1 shows a fiber-optic delay line as known from the prior art. It has four optical transfer switches SW1, SW2, SW3, SW4 disposed adjacent to each other. Adjacent lower terminals are respectively connected to each other, while adjacent upper terminals are connected by connecting pieces delay A, delay B, and delay C. A signal can be coupled into the delay line through port 1 or port 2. The different switching states are illustrated in FIGS. 1A-1H. There are obtained eight different delay stages and a minimum total delay ("minimum delay"), which is generated by the four transfer switches.

FIG. 2 schematically shows a delay line in an exemplary embodiment of the invention, illustrating the different switching states. Here, the delay line includes three transfer switches FS1, FS2, FS3 (3 Bit). Adjacent switches are connected at their lower terminals, and, at their upper terminals, they are connected via fiber-optic delay elements A, B of predefined length. The outer ones of the upper terminals in the delay line are interconnected via delay element C, bypassing transfer switch FS2. FIGS. 2A through 2E show the five different selectable switching states of the three transfer switches FS1, FS2, FS3. Depending on the switching state, a signal transmitted through one of the input ports (port 1, port 2) is delayed by the set amount. In FIG. 2A, all switches are in the lower bar state, where the connection between the lower terminals is straight through. In this setting, the delay line yields the minimum possible delay which, in this embodiment, is obtained from three switches, and not from four, as described in the example of FIG. 1. Further switching states include cross state switching states, where one or both terminal pairs are interconnected crosswise. FIGS. 2B and 2C show two switches having a simple cross state connection and a bar state connection. They each yield the minimum delay plus the delay produced by delay element A (FIG. 2B) or by delay element B (FIG. 2C). In the drawing, this is indicated by "Minimum Delay+Delay A" in FIG. 2B and by "Minimum Delay+Delay B" in FIG. 2C, and by comparable markings in the other figures. In this example, the maximum possible delay is illustrated in FIG. 2E, where the switches each interconnect the terminal pairs crosswise. Here, the total delay includes twice the minimum delay, because the signal passes twice through the three switches, and the delay produced by the fiber-optic delay elements A, B, C of predefined length. The length of the different delay elements is selected depending on the application for which delay line is to be used. Depending on the application, delays of small magnitude may predominantly be desired, for example, if the environmental situation has mainly objects in the near field of the environment sensor to be tested. Conversely, it may be desired to be able to set a minimum delay, but to nevertheless set a large maximum delay for the test of an environment sensor having a long range, such as, for example, a long-range radar. Here is an example: with a minimum delay of 1 meter, the following values are selected for the delay elements: A=5 meters, B=49 meters, C=100 meters. The different selectable total delays resulting therefrom are 1 meter, 6 meters, 50 meters, 55 meters, 156 meters. It should be appreciated that the delay produced by the combination of delay elements A and B (here 54 meters) is obtained through the selection of A and B and cannot be further modified. In contrast to this delay, which is referred to as parasitic delay, all other delay values of this example can be controlled through the selection of the length of the delay elements.

Figure 1A:
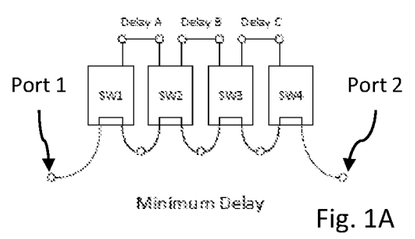
FIG. 1 is a schematic view of an optical delay line according to the prior art.
Figure 1B:
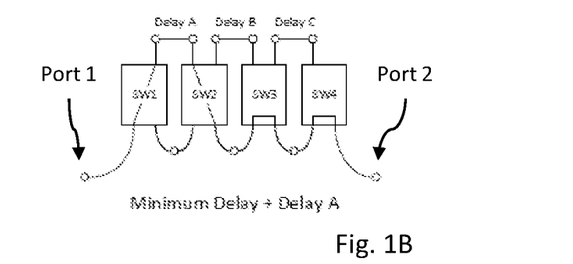
Figure 1C:
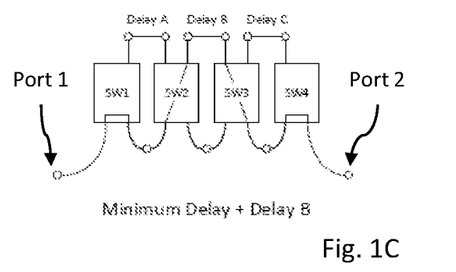
Figure 1D:
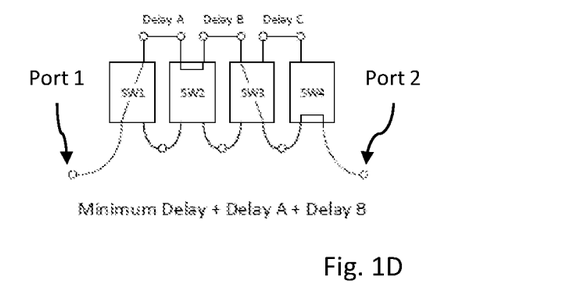
Figure 1E:
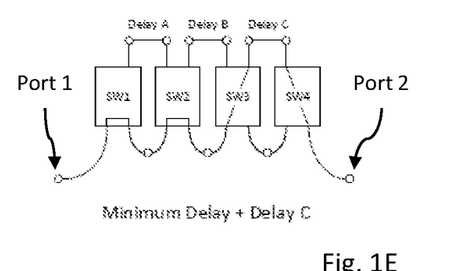
Figure 1F:
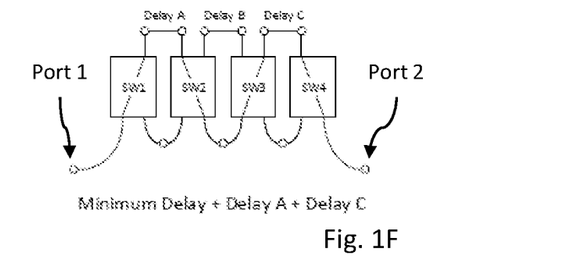
Figure 1G:
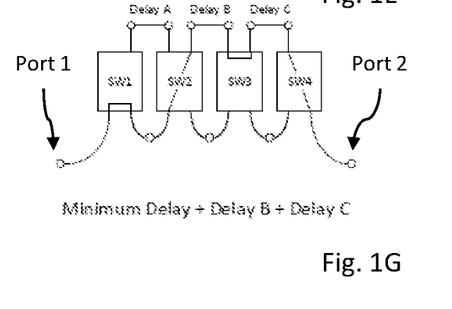
Figure 1H:
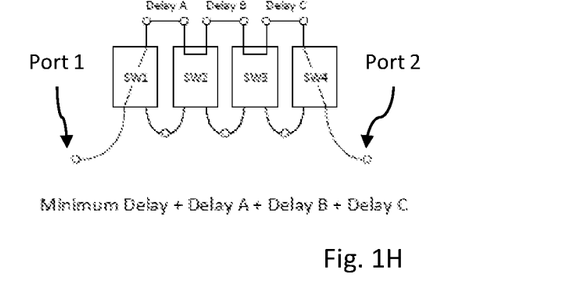
Figure 2A:
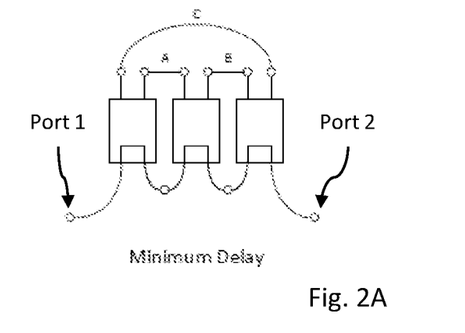
FIG. 2 is a schematic view of a first embodiment of a programmable delay line having three delay stages according to the invention.
Figure 2B:
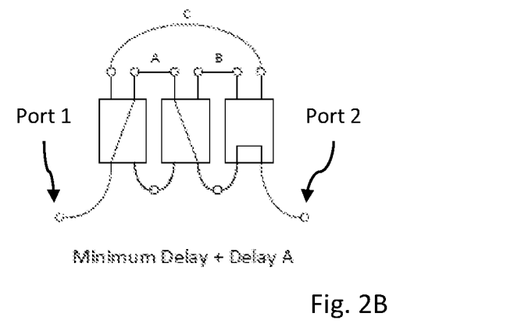
Figure 2C:
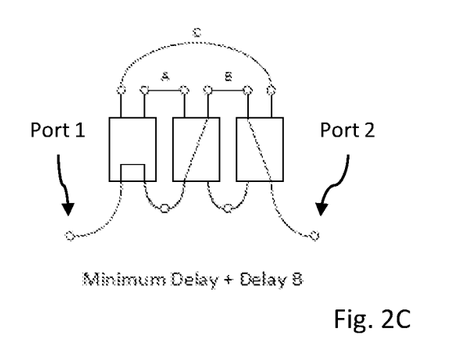
Figure 2D:
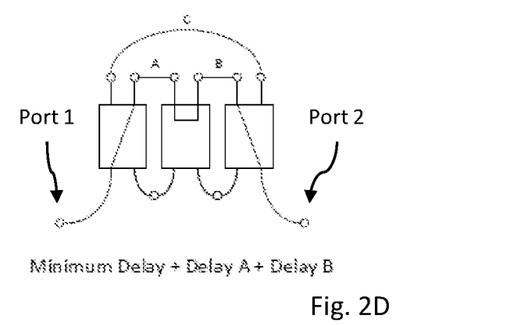
Figure 2E:
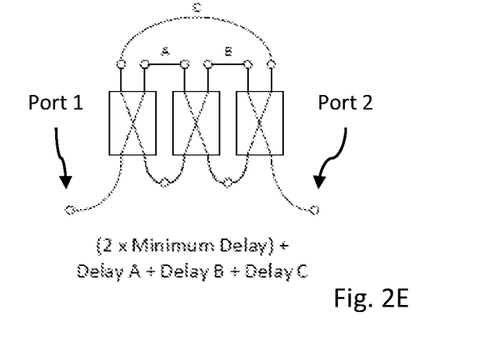
Figure 3:
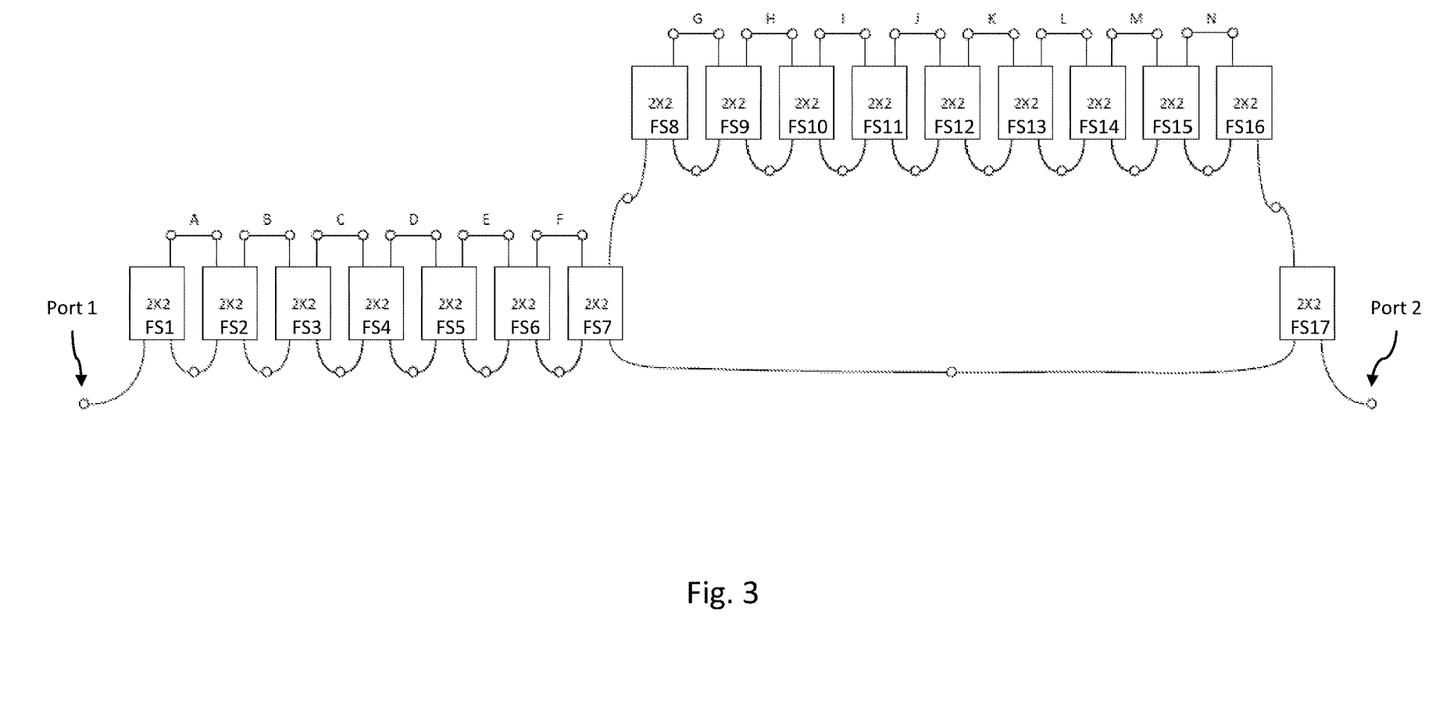
FIG. 3 is a schematic view of a second embodiment of a programmable delay line having 14 delay stages according to the invention.

FIG. 3 contains another exemplary embodiment according to the invention, which here has a delay line including 14 fiber-optic delay elements A, B, C, D, E, F, G, H, I, J, K, L, M, N and a total of 17 transfer switches FS1 through FS17 (14 Bit). In this example, the delay line is divided into two parts, one part including switches FS1 through FS7 and delay elements A through F, and the other part including switches FS8 through FS16 and delay elements G through N, as well as transfer switch FS17. The adjacent switches of the two parts, described earlier for FIG. 2, are connected via their lower facing terminals, and interconnected through the delay elements via their upper facing terminals. The transition to the next part of the delay line begins with transfer switch FS7. Here, the lower terminal of transfer switch FS7 is connected to transfer switch FS17, bypassing the second part of the delay line, while the upper terminal is connected to the lower terminal of transfer switch FS8. Here, terminals of switches FS1, FS8, FS16 and FS17 which are not needed remain open. In this example, a total of 40,960 different combinations are possible with the delay line based on the 14 fiber-optic delay elements. When setting the minimum delay, seven transfer switches instead of 15 transfer switches contribute thereto because of the division of the delay line into two parts.

Figure 4:
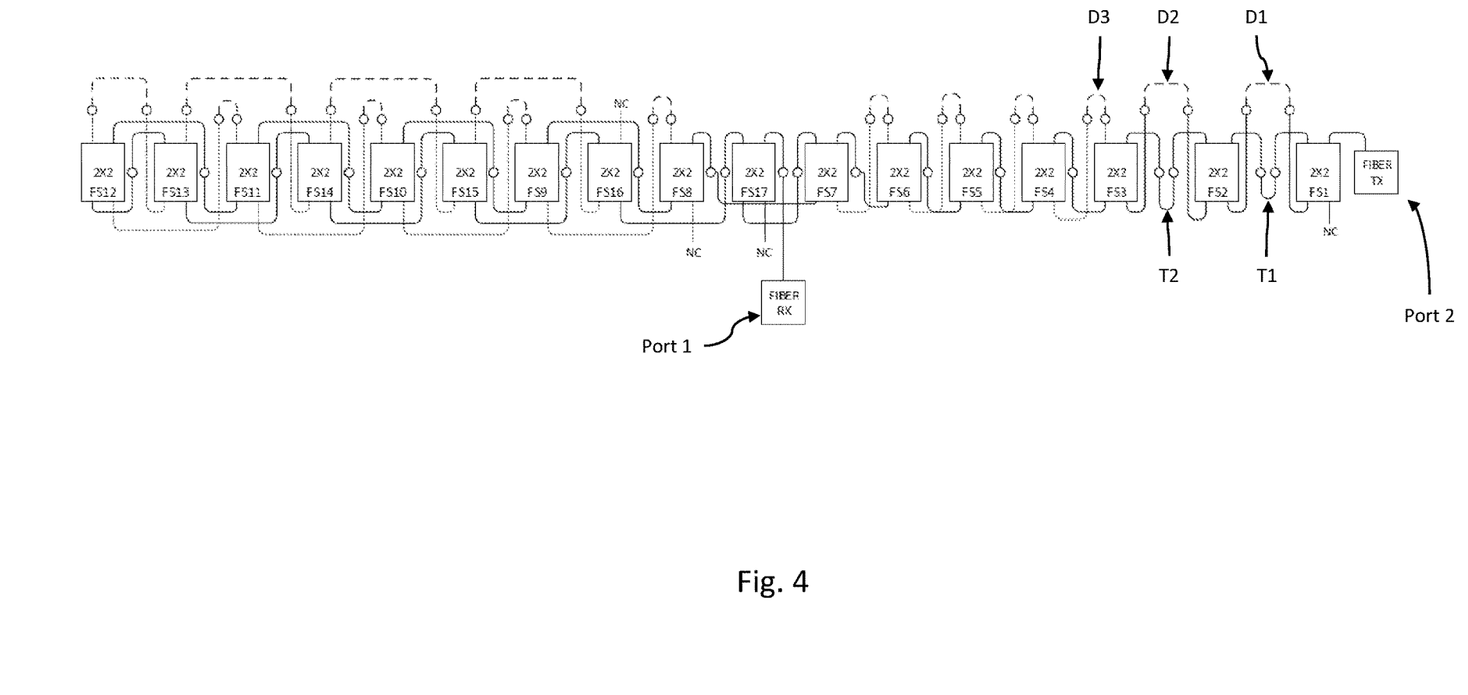
FIG. 4 is a schematic view of a third embodiment of a programmable delay line having 14 delay stages according to the invention.

FIG. 4 shows an exemplary embodiment of the delay line described earlier with reference to FIG. 3. The figure further shows in-coupling points FIBER RX and FIBER TX, which correspond to "Port 1" and "Port 2" in the preceding figures, and via which the signal to be delayed is coupled into and out from the delay line, respectively. The designations indicate that the signal to be delayed that is received by a simulator receiving element, such as a radar receiving antenna, is received through in-coupling point FIBER RX and coupled out through in-coupling or out-coupling point FIBER TX and transmitted by the simulator transmitting element. The connections between the transfer switches are drawn with different line types: Dashed lines indicate fiber-optic delay elements of predefined length; dotted and solid lines designate interconnections between the terminals of the transfer switches.

Transfer switches FS1 through FS7, which are successively traversed by a signal to be delayed in the delay line, are disposed adjacent to each other, as already described with reference to FIG. 3. The length of connecting elements T1 and T2 between transfer switches FS1 and FS2 and between FS2 and FS3 may be selected based on the length of delay elements D1, D2, D3 to provide a constant step size between delay values is obtained at the beginning of the delay line, while also taking into consideration the minimum possible smallest delay. This allows the step size to be smaller than the length of the delay elements. The following values are mentioned by way of example: for a step size of 2.5 cm, the selected values are D1=12.5 cm, D2=15 cm and D3=10 cm. As a result, the following values are selected: T1=10 cm and T2=10 cm.

Here, transfer switches FS8 through FS16 arranged in an interwoven relationship with respect to each other. In this part of the delay line, transfer switches which follow one another within the delay line are not disposed adjacent to each other. This arrangement is chosen to keep the connection between FS7 and FS17 as short as possible.

Figure 5:
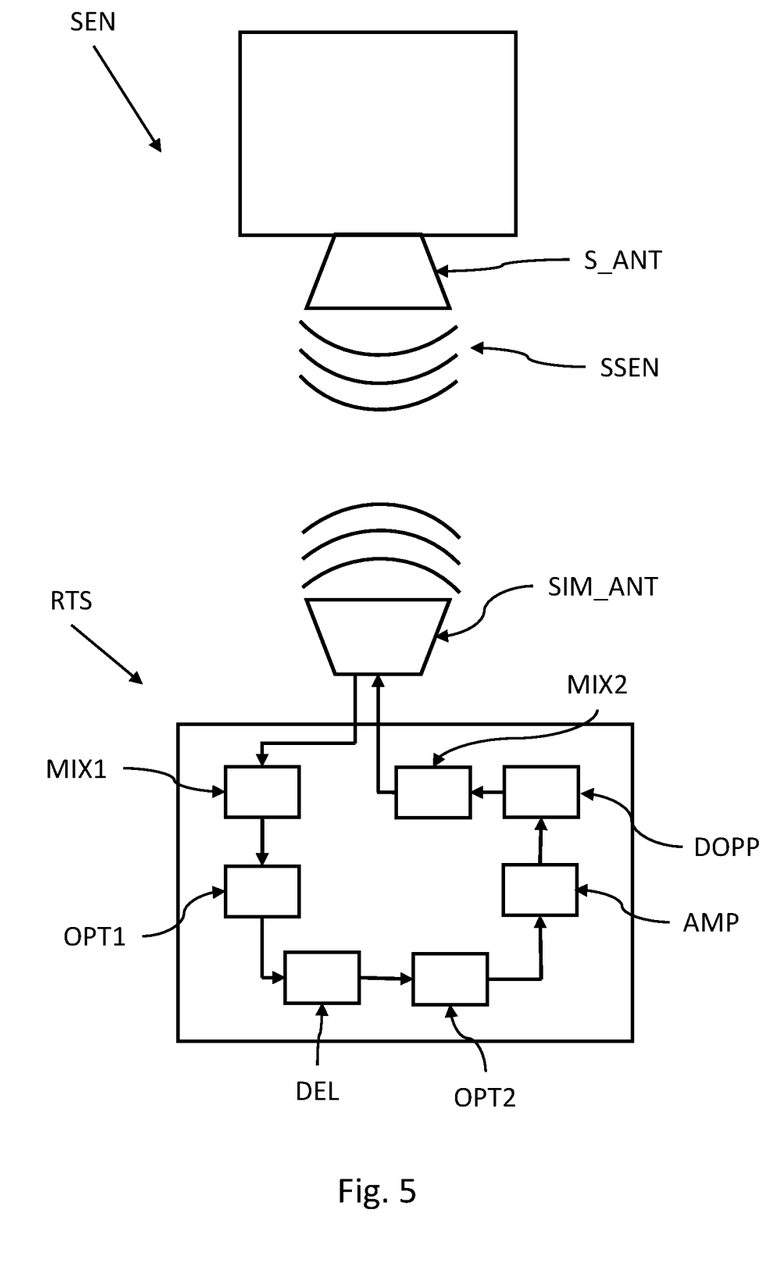
FIG. 5 is a schematic view of a simulator device having a target simulator according to the invention.

FIG. 5 shows a schematic diagram of a simulator device with an environment sensor SEN to be tested, which has a sensor radiating and receiving element S_ANT. Here, environment sensor SEN is a radar ranging device operating at a frequency in the RF range. When operating outside of a simulator, environment sensor SEN determines a distance between environment sensor SEN and an object based on the total travel time of a signal. The contributions to the total travel time of the signal include, in particular, a travel time of scanning signal SSEN to the object and a travel time of an echo signal reflected by the object back to environment sensor SEN.

The schematic diagram of FIG. 5 further includes a target simulator RTS including a simulator radiating and receiving element SIM_ANT, a down-conversion mixer MIX1 capable of down-converting an RF signal to an intermediate frequency, an optocoupler OPT1, the inventive delay line, an amplifier/attenuator AMP, a Doppler generator DOPP (optional, device for impressing a Doppler frequency), and an up-conversion mixer MIX2 capable of up-converting an intermediate frequency signal to an RF signal. Doppler generator DOPP and up-conversion mixer MIX2 may optionally also be implemented in one component.

The receiver in simulator device RTS is configured to receive, via simulator antenna SIM_ANT, a scanning signal SSEN transmitted by ranging device SEN in the form of electromagnetic waves SSEN, to down-convert it to an intermediate frequency via down-conversion mixer MIX1, to transform the down-converted electrical signal, via optocoupler OPT1, into an optical signal (e.g., to a frequency in the infrared range) and couple it into delay line DEL. Simulator device RTS is further configured to transform the delayed signal, via optocoupler OPT2, into an electrical signal, which is amplified or attenuated to the desired level in amplifier/attenuator AMP. The resulting signal may then have a Doppler frequency applied thereto and be up-converted to the original RF frequency by up-conversion mixer MIX2 and transmitted by simulator antenna SIM_ANT.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A programmable fiber-optic delay line for simulating spatial distances for an environment sensor, wherein the programmable fiber-optic delay line comprises:

a first optical transfer switch, comprising a first terminal, a second terminal, a third terminal, and a fourth terminal;

a second optical transfer switch, comprising a first terminal, a second terminal, a third terminal, and a fourth terminal; and a third optical transfer switch, comprising a first terminal, a second terminal, a third terminal, and a fourth terminal;

wherein the first terminal of the first optical transfer switch is connected to the first terminal of the second optical transfer switch by a first delay line corresponding to a first amount of delay;

wherein the second terminal of the second optical transfer switch is connected to the first terminal of the third optical transfer switch by a second delay line corresponding to a second amount of delay different from the first amount of delay;

wherein the second terminal of the first optical transfer switch is connected to the second terminal of the third optical transfer switch by a third delay line corresponding to a third amount of delay different from the second amount of delay and different from the first amount of delay;

wherein the third terminal of the first optical transfer switch is connected to a first port, wherein the fourth terminal of the first optical transfer switch is connected to third terminal of the second optical transfer switch, and wherein the fourth terminal of the second optical transfer switch is connected to the third terminal of the third optical transfer switch; and wherein the first optical transfer switch is configured to be switched between a plurality of switch positions, including:
 a first position in which a signal received from the first port via the third terminal of the first optical transfer switch is output via the fourth terminal of the first optical transfer switch;
 a second position in which a signal received from the first port via the third terminal of the first optical transfer switch is output via the first terminal of the first optical transfer switch to the first delay line; and
 a third position in which a signal received from the first port via the third terminal of the first optical transfer switch is output via the first terminal of the first optical transfer switch to the first delay line and a delayed signal received from the third optical transfer switch via the second terminal of the first optical transfer switch is output via the fourth terminal of the first optical transfer switch to the third terminal of the second optical transfer switch.

2. The programmable fiber-optic delay line according to claim 1, wherein the fourth terminal of the third optical transfer switch is connected to a second port.

3. The programmable fiber-optic delay line according to claim 2, wherein the second and third optical transfer switches are each configured to be switched between a plurality of switching states;

wherein based on a first combination of switching states of the first, second and third optical transfer switches, the programmable fiber-optic delay line provides a minimum amount of delay for a signal transmitted from the first port to the second port;

wherein based on a second combination of switching states of the first, second and third optical transfer switches, the programmable fiber-optic delay line provides an amount of delay for a signal transmitted from the first port to the second port corresponding to the minimum amount of delay plus the first amount of delay;

wherein based on a third combination of switching states of the first, second and third optical transfer switches, the programmable fiber-optic delay line provides an amount of delay for a signal transmitted from the first port to the second port corresponding to the minimum amount of delay plus the second amount of delay;

wherein based on a fourth combination of switching states of the first, second and third optical transfer switches, the programmable fiber-optic delay line provides an amount of delay for a signal transmitted from the first port to the second port corresponding to the minimum amount of delay plus the first amount of delay plus the second amount of delay; and wherein based on a fifth combination of switching states of the first, second and third optical transfer switches, the programmable fiber-optic delay line provides an amount of delay for a signal transmitted from the first port to the second port corresponding to two times the minimum amount of delay, plus the first amount of delay plus the second amount of delay plus the third amount of delay.

4. The programmable fiber-optic delay line according to claim 3, wherein for the fifth combination of switching states of the first, second and third optical transfer switches, the signal transmitted from the first port to the second port traverses each of the first, second and third optical switches twice.

5. A programmable fiber-optic delay line for simulating spatial distances for an environment sensor, wherein the programmable fiber-optic delay line comprises:
 a first plurality of optical transfer switches;
 a second plurality of optical transfer switches; and
 another optical transfer switch;
 wherein a first terminal of each optical transfer switch of the first plurality of optical transfer switches is connected to a first terminal of an adjacent optical transfer switch of the first plurality of optical transfer switches via a respective delay line, and wherein a second terminal of each optical transfer switch of the first plurality of optical transfer switches is connected to a second terminal of an adjacent optical transfer switch of the first plurality of optical transfer switches;
 wherein a first terminal of each optical transfer switch of the second plurality of optical transfer switches is connected to a first terminal of an adjacent optical transfer switch of the second plurality of optical transfer switches via a respective delay line, and wherein a second terminal of each optical transfer switch of the second plurality of optical transfer switches is connected to a second terminal of an adjacent optical transfer switch of the second plurality of optical transfer switches;
 wherein a first optical transfer switch of the first plurality of optical transfer switches is connected to a first port, and wherein a last optical transfer switch of the first plurality of optical transfer switches is connected to the another optical transfer switch;
 wherein a first optical transfer switch of the second plurality of optical transfer switches is connected to the last optical transfer switch of the first plurality of optical transfer switches, and wherein a last optical transfer switch of the second plurality of optical transfer switches is connected to the another optical transfer switch; and wherein the last optical transfer switch of the first plurality of optical transfer switches is configured to be switched between a plurality of switch positions, including:
- a first position in which a signal received by the last optical transfer switch of the first plurality of optical transfer switches is output to the first optical transfer switch of the second plurality of optical transfer switches; and
- a second position in which a signal received by the last optical transfer switch of the first plurality of optical transfer switches is output to the another optical transfer switch to bypass the second plurality of optical transfer switches.

* * * * *